United States Patent
Landry et al.

(10) Patent No.: US 12,449,481 B2
(45) Date of Patent: Oct. 21, 2025

(54) DETECT AND PREVENT BATTERY SWELLING

(71) Applicant: Hewlett-Packard Development Company, L.P., Spring, TX (US)

(72) Inventors: John Landry, Spring, TX (US); Augusto Queiroz de Macedo, Porto Alegre (BR); Amit Kumar Singh, Spring, TX (US); Frederick Lee, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 374 days.

(21) Appl. No.: 18/250,967

(22) PCT Filed: Oct. 30, 2020

(86) PCT No.: PCT/US2020/058287
§ 371 (c)(1),
(2) Date: Apr. 27, 2023

(87) PCT Pub. No.: WO2022/093270
PCT Pub. Date: May 5, 2022

(65) Prior Publication Data
US 2023/0408585 A1    Dec. 21, 2023

(51) Int. Cl.
*G01R 31/371*    (2019.01)
*G01R 31/382*    (2019.01)

(52) U.S. Cl.
CPC ......... *G01R 31/371* (2019.01); *G01R 31/382* (2019.01)

(58) Field of Classification Search
CPC .................... G01R 31/371; G01R 31/382
See application file for complete search history.

(56) References Cited

U.S. PATENT DOCUMENTS

| | | |
|---|---|---|
| 6,469,512 B2 | 10/2002 | Singh et al. |
| 2009/0024339 A1 | 1/2009 | Shoji |
| 2009/0109046 A1 | 4/2009 | Gielniak |
| 2013/0049702 A1 | 2/2013 | Dai et al. |

(Continued)

FOREIGN PATENT DOCUMENTS

| | | |
|---|---|---|
| CN | 102097834 A | 6/2011 |
| CN | 103336245 A | 10/2013 |

(Continued)

*Primary Examiner* — Walter L Lindsay, Jr.
*Assistant Examiner* — Milton Gonzalez
(74) *Attorney, Agent, or Firm* — Quarles & Brady LLP

(57) ABSTRACT

Examples are described herein for monitoring power source usage of a computing device, including a battery and another power source, over time. In various examples, time periods of this monitored time may be added to a time count based on their immediately previous or immediately subsequent time periods satisfying a condition. The time count may be used to track periods of time during which certain power source usage factors are present that may lead to or may indicate the presence of battery swelling. After a time period is added to the time count, the updated time count can be compared to a time count threshold, and a user of the computing device may be warned based on the comparison. The threshold and warning may be selected to warn a user of potential present or future swelling of the battery.

15 Claims, 5 Drawing Sheets

(56) References Cited

U.S. PATENT DOCUMENTS

| | | | |
|---|---|---|---|
| 2014/0042961 A1* | 2/2014 | Lan | H02J 7/00719 |
| | | | 429/61 |
| 2015/0084600 A1 | 3/2015 | Sengupta et al. | |
| 2016/0064960 A1 | 3/2016 | Dicarlo et al. | |
| 2016/0079777 A1 | 3/2016 | Bhardwaj | |
| 2016/0322676 A1 | 11/2016 | Jun et al. | |
| 2018/0149462 A1 | 5/2018 | Ghantous et al. | |
| 2019/0097278 A1* | 3/2019 | Park | G01B 7/16 |
| 2019/0363407 A1 | 11/2019 | Noh | |
| 2020/0203783 A1* | 6/2020 | Ringuette | G01R 31/392 |
| 2022/0006315 A1 | 1/2022 | Dou et al. | |
| 2023/0006273 A1* | 1/2023 | Kim | H01M 50/242 |

FOREIGN PATENT DOCUMENTS

| | | |
|---|---|---|
| CN | 110048481 A | 7/2019 |
| CN | 110249476 A | 9/2019 |
| DE | 102010036397 A1 | 1/2012 |
| WO | 2020/088424 A1 | 5/2020 |
| WO | 2020/162646 A1 | 8/2020 |

\* cited by examiner

DETECT AND PREVENT BATTERY SWELLING

BACKGROUND

As consumer demand for thinner battery-powered electronics increases, pressure has likewise increased on battery cell manufacturers to provide Lithium-Ion ("LiION") batteries with tighter spatial specifications while still ensuring competitive battery performance.

BRIEF DESCRIPTION OF THE DRAWINGS

The present application may be more fully appreciated in connection with the following detailed description taken in conjunction with the accompanying drawings, in accordance with an example of the present disclosure.

DETAILED DESCRIPTION

Figure 1:
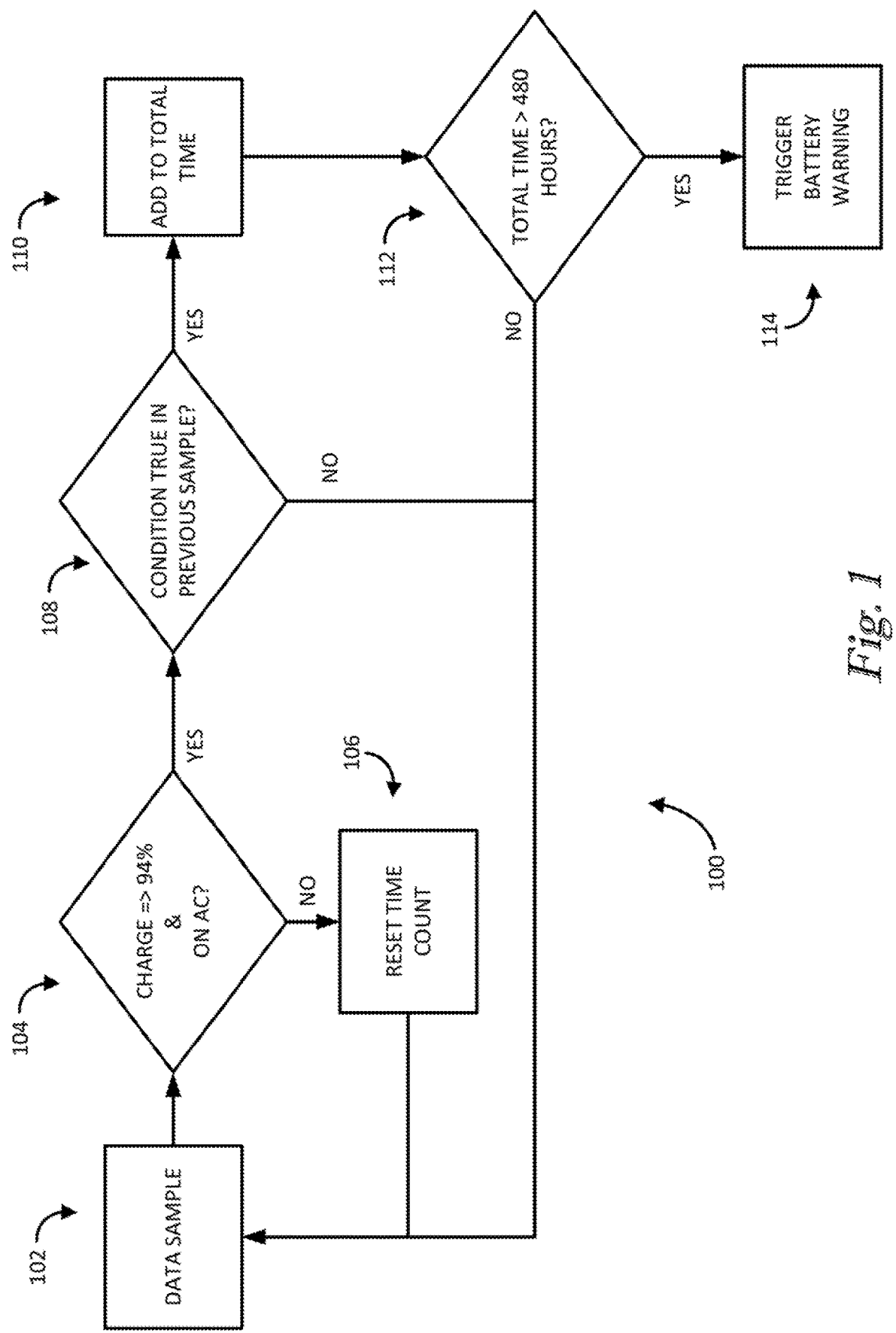
FIG. 1 is a flowchart summarizing an example method of tracking battery charging behavior and warning a user of conditions that can cause battery swelling, in accordance with an example of the present disclosure.

LiION batteries generate power through chemical reactions. As LiION batteries age, these chemical reactions become less efficient and can result in the creation of gas which may be trapped between the layers of the batteries. This gas can eventually puncture membranes between the layers, leading to a swollen battery. Such swelling can lead to greatly reduced battery performance. Particularly in thinner battery-powered electronics, this swelling also can lead to the expanded battery applying pressure on nearby electrical components and exterior encasements, causing further issues with aesthetics, ergonomics, and performance of electronics.

Several consumer usage factors may play a part in causing a LiION battery of an electronic device to swell. Two of the most common of these factors are overcharge conditions and excessive temperatures. When LiION batteries are maintained in a high charge state for long periods of time, lithium atoms begin to concentrate in certain areas of the battery causing damage to the layers separating these areas within the battery. The damage accumulates particularly quickly at high temperatures.

These factors often arise with electronics that some consumers keep plugged in during use, and which are rarely turned off when not in use. For example, many consumers use a laptop that they keep plugged in and powered on for long periods of time. This can lead to overcharge conditions in the battery and, in some cases, excessive battery temperatures, particularly if other components of the laptop are prone to overheating when left turned on for long periods of time. Moreover, as LiION batteries begin to age or show signs of defect or damage, excessive battery temperature during overcharging may occur easier and more often.

Examples are described herein for using a battery swelling monitoring system to efficiently detect battery charging conditions that lead to LiION battery swelling. In various examples, monitoring of battery usage is used to identify conditions that cause battery swelling in order to trigger provision of notifications to users of associated computing devices. These notifications may inform users of ways in which they can avoid causing battery swelling, or when their batteries are already experiencing swelling and need to be replaced or repaired.

In some implementations, the battery swelling monitoring system may be implemented as computing device firmware, in which case it may monitor battery usage locally. In some implementations, the battery swelling monitoring system may collect battery usage data from the computing device(s) and analyze and monitor it remotely using a cloud-based service communicating with the computing device firmware and employing a cloud infrastructure, e.g., using multiple servers or high-performance computers capable of monitoring battery usage data of multiple computing devices. The device firmware and/or cloud-based service may then trigger notification events based on the monitored battery usage. In the case of a cloud-based service triggering the notifications, the notifications may be provided to the user of a device or to a device manager associated with a fleet of devices, or to both. Furthermore, in some examples, triggering of a notification event may also trigger an alteration by the device firmware, or a request to the device firmware for alteration, of the current charging routine or charging mode of a computing device.

In some examples, notifications informing users that their battery charging behavior may lead to future swelling may be triggered by detections of continuous charging of a LiION battery over a threshold number of hours or days. Such a threshold may be tailored to empirical knowledge or the known conditions of particular batteries or of computing devices using the monitored batteries. This knowledge or these known conditions may be determined based on the sampled data and/or based on information received from manufacturers, suppliers, and users of the computing devices. For example, such empirical knowledge and/or known conditions may include battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization that operates the computing device of similar batteries or computing devices. In some cases, these notifications may include information pertaining to how to avoid future battery swelling, such as an instruction to unplug or shut down a laptop for a period of time.

FIG. 1 is a flowchart summarizing an example method 100 of tracking battery charging behavior and warning a user of conditions that can cause battery swelling, as performed by a battery swelling monitoring system described herein.

In some examples, the battery swelling monitoring system may be a separate and/or remote system from the firmware of the computing device that is associated with the battery to be monitored. In one such example, the battery swelling monitoring system may communicate with the firmware of the computing device over a communication bus or communication network to request samples of data pertaining to the charging of the battery of the computing device in order to monitor for charging behavior that can cause battery swelling. In another such example, an update to the firmware of the computing device may cause the computing device firmware to send such samples to the battery swelling monitoring system without receiving a request, or periodically after receiving such a request. In other examples, the battery swelling monitoring system may itself be a part of a firmware update or operating system of the computing device, and receiving samples of battery charging data for the computing device may include sampling data available locally on the computing device, including sensor data of sensors internal to or communicatively coupled to the computing device.

In some examples, the battery swelling monitoring system may include both local and remote components. In such examples, the remote component(s) of the battery swelling monitoring system may be in communication with local components of the battery swelling monitoring system integrated with multiple computing devices. Thus, the battery swelling monitoring system may track battery charging behavior in an entire fleet of computing devices.

The samples of battery charging data may include data describing a current charge level of the battery, whether the battery is currently being charged by another power source, a current battery temperature at the time the sample was taken, and/or a timestamp or other indication of when the sample was taken. The samples may be taken at regular intervals, for example every hour. In some examples, the samples may also be taken when certain power state transitions occur in the computing device, for instance when the computing device switches power sources, when the computing device is turned on, or when the computing device transitions between power states including a "sleep" power state transition and a "wake" power state transition. In some examples, the samples may be taken periodically based on certain power states and power state transitions, e.g., hourly after the battery begins being charged by an alternating current ("AC") power source or hourly so long as the battery is being charged by an AC power source.

Method 100 processes these samples of battery charging data in order to keep a time count of the amount of time that the computing device is determined to have been continuously charging at or above a particular battery charge level threshold, such that method 100 may trigger a warning to a user of the computing device when continuous battery overcharging occurs for so long as to lead to conditions that cause battery swelling.

Method 100 begins at block 102 with processing a sample of the battery charging data for a computing device. For each sample of battery charging data, it is first determined if the sample meets two criteria at block 104. These two criteria indicate overcharging conditions in the battery and include satisfaction of a minimum charge level threshold that may indicate overcharging is occurring, e.g., 80% or 94%, and that the battery charging data indicates that the battery is still being charged by another power source. If the sample fails to meet one or both of these criteria, then the time count is reset at block 106 and method 100 returns to block 102 to wait for another sample. Resetting the time count may include lowering the amount of time included in the time count or starting a new time count to be used as the time count during future iterations of method 100.

If the sample meets both of these criteria, then method 100 moves to block 108 where the battery swelling monitoring system determines if the immediately previous sample also met the two criteria. If the previous sample did not also meet these two criteria, then no time is added to the time count and method 100 returns to block 102 to wait for another sample; however the time count is not reset. An amount of time is added to the time count where two consecutive samples meet the two criteria, indicating a likelihood that these two criteria were met for the time period between the timestamps of these sequential samples. When this is the case, the battery swelling monitoring system may determine an amount of time that occurred between when the two samples were taken, and that amount of time may be added to the time count at block 110.

Each time an amount of time is added to the time count, the time count is compared to a threshold amount of time, for example 20 days or 480 hours, at block 112. This threshold amount of time represents the amount of time that the battery swelling monitoring system determines that continuously overcharging the battery is likely to lead to battery swelling. This threshold amount of time may be selected based on empirical knowledge or the known conditions of particular batteries or of computing devices using the monitored batteries. This knowledge or these known conditions may be determined based on the sampled data and/or based on information received from manufacturers, suppliers, and users of the computing devices. For example, such empirical knowledge and/or known conditions may include battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization associated with similar batteries or computing devices.

If, at block 112, it is determined that the total amount of time in the time count is less than or equal to this threshold amount of time, then the battery swelling monitoring system does not trigger provision of a battery charging warning to the user of the computing device, and the battery swelling monitoring system waits for another sample. If, at block 112, it is determined that the total amount of time in the time count is greater than this threshold amount of time, then the battery swelling monitoring system triggers provision of the battery charging warning to the user at block 114. The time count will not be reset, however, until method 100 determines that a sample does not meet the two criteria at block 104.

In examples where the battery swelling monitoring system is monitoring an entire fleet of computing devices, the threshold amount of time may be selected for all monitored computing devices, for each computing device, for each group of similar computing devices, or for each group of computing devices meeting certain criteria (e.g., age, location, employee designation of the user, etc.). Thus, for example, employee laptops that are left at work over the weekend may display the battery charging warning a few days earlier than frequently used personal laptops, to account for an employee potentially missing a battery charging warning that displays on a laptop left on and charging over the weekend. As another example, a laptop kept in a warm climate, such as a work shop that does not include air conditioning, may display a warning earlier than laptops kept in climate-controlled rooms, to account for the fact that overcharging with a higher battery temperature causes batteries to swell faster.

Triggering the battery charging warning at block 114 may include displaying a battery charging warning on the display of the computing device, providing an audible battery charging warning through a speaker associated with the computing device, or providing the computing device or another computing device of the user with an instruction, command, or request to provide an audio or visual battery charging warning. In examples in which the battery swelling monitoring system includes components both local and remote to the computing device, this may include a remote component providing an instruction to the local component which causes the local component to display the battery charging warning or to instruct the computing device or some other software application installed on the computing device to display the battery charging warning. In some examples in which a fleet manager uses the battery swelling monitoring system to monitor an entire fleet of computing devices, the battery charging warning may be provided to a computing device of the fleet manager.

In some examples, the battery charging warnings may warn users that their battery charging behavior may lead to future swelling. The battery charging warning may inform the users of their behavior that led to such a warning, e.g., keeping the laptop plugged in and turned on for more than X days. The battery charging warning may inform the users how they can prevent future swelling, e.g., unplugging the laptop charger when the charge level of the battery is greater than 94%.

In some examples, triggering the battery charging warning may additionally trigger a change in charging behavior of the computing device. For example, triggering the battery charging warning locally or receiving the battery charging warning from a remote component or system may cause the firmware of the computing device to alter the current charging routine or mode, for example by causing the computing device to draw power from the battery until the charge level falls below 80%.

In some examples, method 100 may additionally include a failsafe check block (not shown) that compares the amount of time that passed between the timestamps of two sequential samples to a maximum time threshold. After determining this amount of time, method 100 may first compare it to this maximum time threshold before adding it to the time count at block 110.

At this failsafe check block, if it is determined that the amount of time that occurred between the timestamps of the two sequential samples is at or below the maximum time threshold, then that amount of time may be added to the time count at block 110. If the amount of time corresponding to the difference between the samples' timestamps is greater than this maximum time threshold, then no time is added to the time count and method 100 returns to block 102 to await another sample. For example, if the maximum time threshold is 60 minutes and the amount of time occurring between the timestamps of two sequential samples is 32 minutes, then 32 minutes will be added to the time count at block 110. However, if the maximum time threshold is 60 minutes and the amount of time between the timestamps of the two sequential samples is 120 minutes, then no time is added to the time count and method 100 returns to block 102 to await another sample.

This failsafe check block thus acts to prevent large amounts of time being added to the time count due to communication issues or a failure to sample the battery charging data. Such issues may arise, for example, when a computing device is turned off for a period of time. In examples in which at least some of the samples are taken periodically, the threshold amount of time may correspond to the periodic sampling rate. For example, in a system in which samples are taken at least once every 60 minutes, amounts of time greater than 60 minutes may not be added to the time count.

Figure 2:
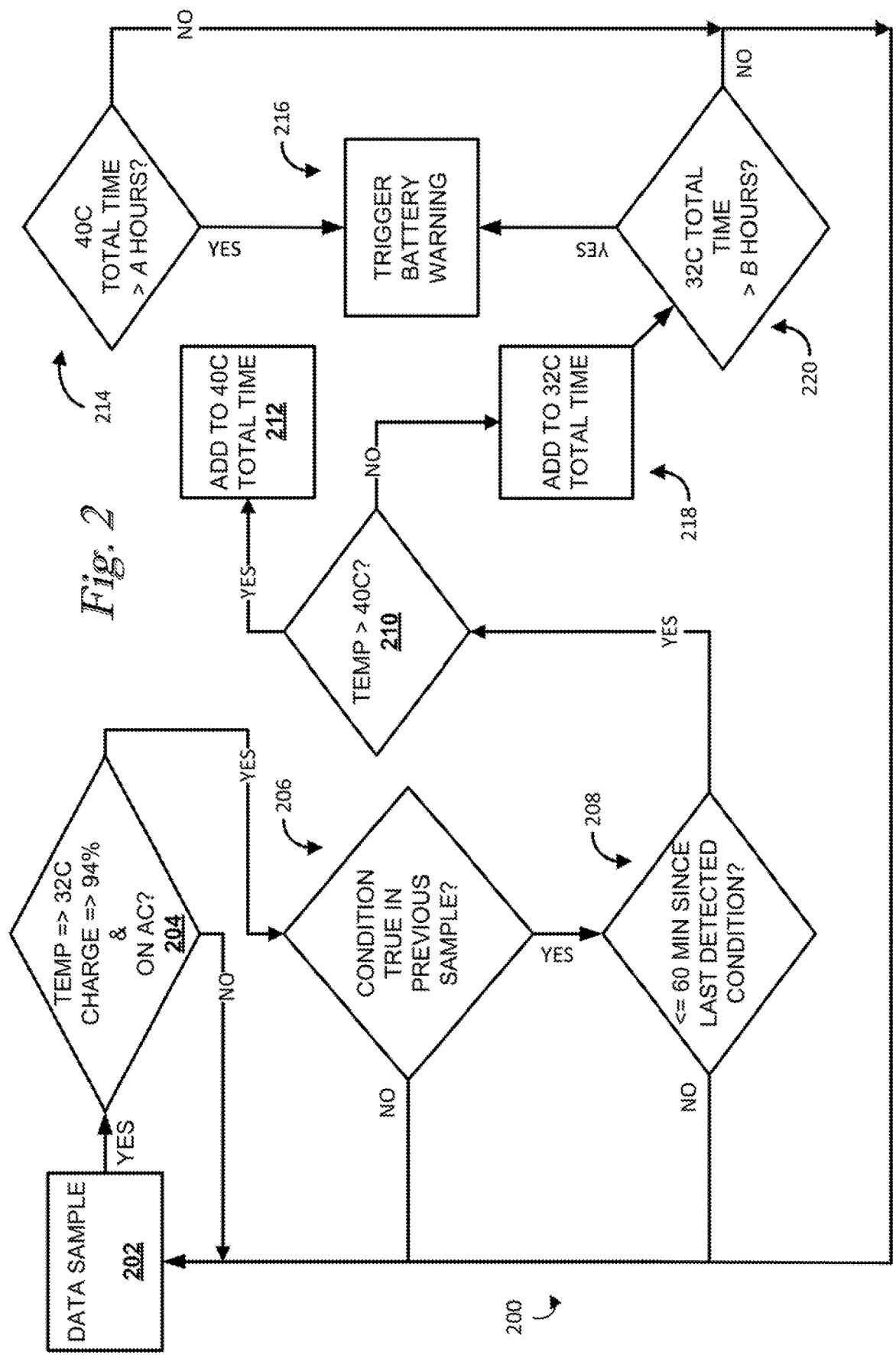
FIG. 2 is a flowchart summarizing an example method of tracking battery charging behavior and warning a user that overcharge conditions have likely caused battery swelling, in accordance with an example of the present disclosure.

FIG. 2 is a flowchart summarizing an example method 200 of tracking battery charging behavior and warning a user that overcharge conditions have likely caused battery swelling, as performed by a battery swelling monitoring system described herein. The battery swelling monitoring system of FIG. 2 may be the battery swelling monitoring system as described with respect to FIG. 1, for example. Method 200 of FIG. 2 may include similar processes to method 100, but may take further battery health considerations into account, such as battery overheating during the overcharge conditions.

Method 200 begins at block 202 with processing a sample of the battery charging data for battery of a computing device. For each sample of the battery charging data, it is first determined if the sample satisfies a set of three criteria at block 204. These three criteria indicate the presence of both overcharging and overheating conditions in the battery and include satisfaction of a minimum battery temperature threshold that may indicate battery overheating (e.g., 35 degrees Celsius), satisfaction of a minimum charge level threshold that may indicate overcharging is occurring (e.g., 80% or 94%), and that the battery charging data indicates that the battery is still being charged by another power source (e.g., battery connected to AC power). If the sample fails to satisfy any of these criteria, then method 200 returns to block 202 to wait for another sample.

If the sample satisfies all three of these criteria, then method 200 moves to block 206 where the battery swelling monitoring system determines if the immediately previous sample also satisfied the three criteria. If the previous sample did not also satisfy these three criteria, then no time is added to the time count and method 200 returns to block 202 to wait for another sample. In order for an amount of time to be added to a time count, method 200 checks that two consecutive samples satisfy the three criteria, indicating a likelihood that these three criteria were met for the time period between the timestamps of these sequential samples. When this is the case, the battery swelling monitoring system may determine an amount of time that occurred between when the two samples were taken, and this is the amount of time that may be added to a time count at blocks 212 or 218.

Before anytime is added to a time count at blocks 212 or 218, method 200 first conducts a failsafe check block at block 208 by comparing the amount of time that passed between the timestamps of the two sequential samples to a maximum time threshold. At block 208, if it is determined that the amount of time that occurred between the timestamps of the two sequential samples is at or below the maximum time threshold, then that amount of time may be added to a time count at blocks 212 or 218. If the amount of time corresponding to the difference between the samples' timestamps is greater than this maximum time threshold, then no time is added to a time count and method 200 returns to block 202 to wait for another sample. For example, if the maximum time threshold is 60 minutes and the amount of time occurring between the timestamps of two sequential samples is 32 minutes, then 32 minutes will be added to a time count at blocks 212 or 218. However, if the maximum time threshold is 60 minutes and the amount of time between the timestamps of the two sequential samples is 120 minutes, then no time is added to the time count and method 200 returns to block 202 to wait for another sample.

This failsafe check block thus acts to prevent large amounts of time being added to the time count due to communication issues or a failure to sample the battery charging data. Such issues may arise, for example, when a computing device is in a "sleep" mode or turned off for a period of time. In examples in which at least some of the samples are taken periodically, the threshold amount of time may correspond to the periodic sampling rate. For example, in a system in which samples are taken at least once every 60 minutes, amounts of time greater than 60 minutes may not be added to a time count.

Method 200 may use two time counts in order to detect potential battery swelling in different ways. Both time counts may include time periods in which the battery swelling monitoring system has determined that overheating and overcharging conditions were occurring, but one time count may be used to track the time in which the overheating conditions were milder and another time count may be used to track the time in which the overheating conditions were more extreme. More extreme battery temperatures during overcharging may cause battery swelling to occur more quickly. More frequently experienced extreme battery temperatures during overcharging, even for short periods of time, may further indicate that damage has already occurred to the battery, as swollen batteries are more likely to overheat when overcharged. Thus, a time count corresponding to the milder overheating conditions may be used to detect occurrences of conditions that may lead to battery swelling over the long term, and a time count corresponding to the more extreme overheating conditions may be used to detect occurrences of conditions that may lead to battery swelling over the short term, or to detect already present battery swelling more quickly after monitoring by the battery swelling monitoring system begins.

If the amount of time between the timestamps of the two sequential samples was less than or equal to the maximum time threshold of block 208, method 200 proceeds to block 210 and compares the battery temperature associated with the most recent sample to a battery temperature threshold, e.g., 40 degrees Celsius, that is greater than the minimum battery temperature threshold of block 204, e.g., 35 degrees Celsius, in order to determine whether to add the amount of time between the timestamp of the most recent sample and the timestamp of the immediately previous sample to the time count associated with milder overheating conditions at block 218 or to the time count associated with more extreme overheating conditions at block 212. For example, if the battery temperature associated with the most recent sample is 41 degrees Celsius, then the amount of time is added to the time count associated with more extreme overheating conditions at bock 212. However, if the battery temperature associated with the most recent sample is 38 degrees Celsius, then the amount of time is added to the time count associated with milder overheating conditions at bock 218.

Each time an amount of time is added to a time count at block 212 or 218, the time count is compared to a corresponding threshold amount of time, A, B, for example 10 days or 480 hours, at blocks 214 or 220. These threshold amounts of time represent the amount of time that the battery swelling monitoring system determines that continuously overcharging the battery, at the temperatures corresponding to that time count, is likely to have caused to battery swelling. This threshold amount of time may be selected based on empirical knowledge or the known conditions of particular batteries or of computing devices using the monitored batteries. This knowledge or these known conditions may be determined based on the sampled data and/or based on information received from manufacturers, suppliers, and users of the computing devices. For example, such empirical knowledge and/or known conditions may include battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization associated with similar batteries or computing devices.

In some examples, blocks 214 and 220 may use different threshold amounts of time. For example, the threshold amount of time A that is compared to the time count associated with the more extreme overheating conditions may be lower than the threshold B associated with the milder overheating conditions, as more extreme overheating conditions during overcharging indicate faster and/or greater damage likely occurring in the battery.

If, at blocks 214 or 220, it is determined that the total amount of time in the time count is less than or equal to the corresponding threshold amount of time (A or B), then the battery swelling monitoring system does not trigger provision of a battery warning to the user of the computing device, and method 200 returns to block 202 to wait for another sample. If, at blocks 214 or 220, it is determined that the total amount of time in the time count is greater than the corresponding threshold amount of time, then the battery swelling monitoring system triggers provision of the battery warning to the user at block 216.

In examples where the battery swelling monitoring system is monitoring an entire fleet of computing devices, the threshold amount of time for each time count may be selected for all monitored computing devices, for each computing device, for each group of similar computing devices, or for each group of computing devices meeting certain criteria (e.g., age, location, employee designation of the user, etc.).

Triggering the battery warning at block 216 may include displaying a battery warning on the display of the computing device, providing an audible battery warning through a speaker associated with the computing device, or providing the computing device or another computing device of the user with an instruction, command, or request to provide an audio or visual battery warning. In examples in which the battery swelling monitoring system includes components both local and remote to the computing device, this may include a remote component providing an instruction to the local component which causes the local component to display the battery warning or to instruct the computing device or some other software application installed on the computing device to display the battery warning. In some examples in which a fleet manager uses the battery swelling monitoring system to monitor an entire fleet of computing devices, the battery warning may be provided to a computing device of the fleet manager.

In some examples, the battery warnings may warn users that their battery needs to be repaired or replaced. The battery warning may inform the users of battery health indicators that led to such a warning, e.g., extreme overheating while overcharging. The battery warning may inform the users of the behavior that led to such a warning, e.g., excessive overcharging or charging in a warm environment. The battery warning may inform the users how they can prevent future swelling after battery replacement or repair, e.g., unplugging the laptop charger when the charge level of the battery is greater than 94% and/or unplugging when the laptop feels warm.

In some examples, rather than separate time counts with separate comparison temperature thresholds, one time count and one temperature threshold may be used. In these examples, the amount of time to be added to the time count may be adjusted based on the associated battery temperature, e.g., adjusted upwards when the battery temperature is high. These adjustments may be based on the known conditions of the batteries or the computing devices, as discussed above with respect to selecting threshold amounts of time.

Figure 3:
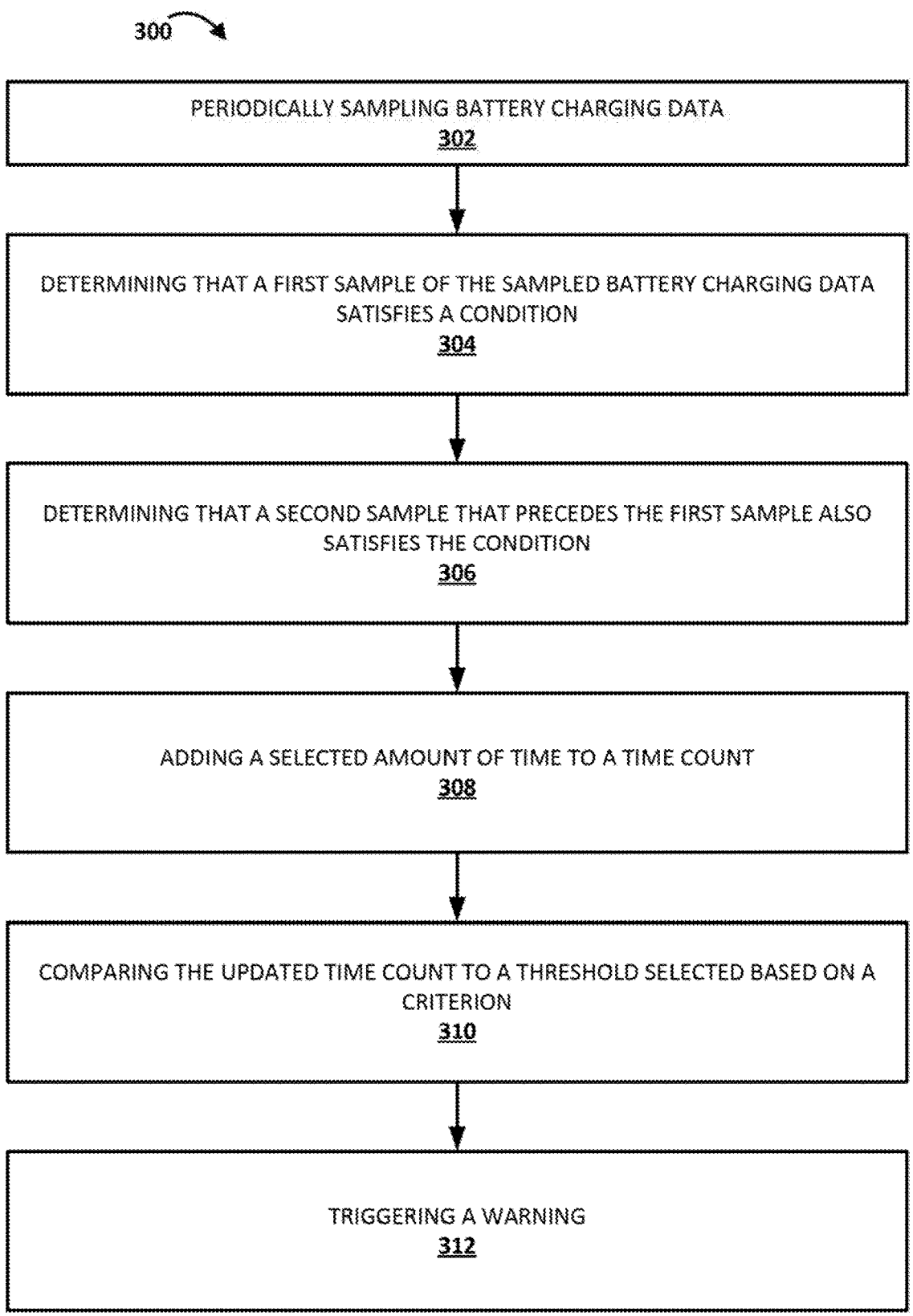
FIG. 3 is a flow diagram that illustrates an example method, in accordance with an example of the present disclosure.

FIG. 3 is a flowchart summarizing an example method 300 of tracking battery charging behavior and warning a user that overcharge conditions are likely to lead to or have likely already caused battery swelling, as performed by a battery swelling monitoring system described herein. The battery swelling monitoring system of FIG. 3 may be the battery swelling monitoring system as described with respect to FIGS. 1 and 2, for example.

Method 300 begins at block 302 with periodically sampling the battery charging data of a computing device. The processes of block 302 may be performed by a battery swelling monitoring system included in the firmware of the computing device or by a battery swelling monitoring system including components communicatively coupled to the firmware of the computing device, for example over a wired or wireless network connection. Periodically sampling the battery charging data may include reading data available locally on the computing device, including reading sensor values for sensors internal to or communicatively coupled to the computing device. The battery charging data sampled by the battery swelling monitoring system may describe current conditions of the battery of the computing device including battery temperature data, battery charge level data, and indications of whether a power source is recharging the battery. The samples of the battery charging data may further include a timestamp or a time period corresponding to an instance or period of time that the sample represents. In some examples, the battery charging data may be aggregated or averaged for a time period, and a sample may represent the average or aggregated battery charging data over this time period.

Method 300 continues at block 304 with processing a first sample of the battery charging data in order to determine that the first sample satisfies a condition. This condition may include that values of the battery charging data of the sample conform to certain proscribed values or value ranges associated with overcharging and/or overheating during overcharging of the battery. For example, the condition may include satisfying the two criteria of block 104 in FIG. 1 or the three criteria of block 204 in FIG. 2. In other examples, the condition may merely be conformance to a range of charge levels of the battery, e.g., at least 80% or over 94%.

Once it is determined that the first sample satisfies this condition, method 300 proceeds to block 306 where it is determined that a second sample, corresponding to the sample taken immediately prior to the first sample, also satisfies the condition. In the case of samples indicating timestamps, both samples satisfying the condition may indicate that those conditions were likely true for the period of time between those timestamps. In the case of samples indicating time periods, both samples satisfying the condition may indicate that it is a pattern of user behavior, rather than battery malfunction, causing the overcharging and/or overheating conditions in the battery. In such cases, both samples satisfying the condition may also indicate continuous, prolonged overcharging and/or overheating conditions in the battery that may lead to battery swelling sooner.

After determining that both the first and second sample satisfy the condition, method 300 proceeds to block 308 where an amount of time selected based on the samples is added to a time count. In some examples, this selected amount of time corresponds to the time period between a timestamp of the second sample and a timestamp of the first sample. In some examples, this amount of time corresponds to the length of the time period associated with the first or second sample. In some examples, this amount of time may correspond to a maximum sampling period between timestamps. For example, if the time period between the timestamps for the first and second samples is 120 minutes but the maximum sampling period is 60 minutes, then only 60 minutes may be added to the time count. Such considerations may allow the system to continue monitoring battery charging behavior even when communication or connection issues prevent all of the samples from being taken or received by the system, e.g., by generating conservative estimates of overcharge and/or overheat conditions based on the data available.

In some examples, the amount of time to add to a time count may be adjusted based on temperatures associated with one or both of the samples. This may cause the battery warning to trigger sooner when samples indicate overheating above a certain level or frequent overheating during overcharging of the battery. This may cause the battery warning to trigger later when samples indicate only minor or infrequent overheating during overcharging. In some examples, more than one time count may be used, and amounts of time may be added to one or multiple of the time counts based on different conditions associated with each time count. For example, a first time count may be used to track continuous overcharging or overheating during overcharging, and a second time count may track overcharge or overheat and overcharge conditions over the life of the battery. In this example, the first time count may be reset whenever a sample of the battery charging data does not indicate overcharging or overheating during overcharging, but the second time count may only be reset when the battery is replaced or repaired or a battery swelling monitoring system administrator causes the second time count to be reset. As another example, there may be two time counts that track continuous overcharging, one in which time periods are placed when they correspond to a first range of temperatures and one in which they are placed when they correspond to a second range of temperatures.

After updating the time count(s) at block 308, method 300 compares each of the updated time count(s) to corresponding threshold. The thresholds may be selected for each time count based on a criterion for the type of user or computing device behavior worthy of a given warning. Thus, the amounts of time to be added to the time counts may be adjusted to cause the battery warning to trigger differently for different situations, multiple time counts may be used to trigger different battery warnings for each situation worthy of a warning, and/or multiple or different thresholds may be selected for each type of warning to be given or for each situation warranting provision of a warning. For example, the threshold to warn may be lower for time counts associated with more extreme overheating conditions during overcharging or with continuous overheating and overcharging conditions compared to higher thresholds for time counts associated with milder overheating during overcharging conditions or only intermittent overheating and overcharging. As another example, the threshold may be lower to trigger a warning about user charging behavior that could lead to battery swelling in the future compared to a higher threshold for warning the user that their battery is swollen and needs to be replaced.

In some examples, the threshold of block 310 may be tailored to empirical knowledge or the known conditions of particular batteries or of computing devices using the monitored batteries. This knowledge or these known conditions may be determined based on the sampled data and/or based on information received from manufacturers, suppliers, and users of the computing devices. For example, such empirical knowledge and/or known conditions may include battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization associated with similar batteries or computing devices.

When it is determined that an updated time count satisfies a threshold at block 310, method 300 proceeds to trigger a warning at block 312. As disclosed herein, the warning may be provided as a user notification via a display and/or speaker associated with the computing device or another computing device of the user, as a request transmitted to a component of the computing device firmware to display or play a message or to alter current charging behavior, or as an indication transmitted to a battery swelling monitoring system administrator, which may include transmitting a request to display or play a message to a computing device of a human administrator or may include transmitting data packets to applications or servers that manage computing device or user behavior associated with battery charging.

In some examples, different time counts and/or different comparison thresholds may trigger different battery warnings. These may warn users that their battery charging behavior may lead to future swelling, that their battery charging behavior has likely already led to swelling, or that a battery needs to be repaired or replaced. The battery charging warning may inform the users of their behavior that led to such a warning, e.g., keeping the laptop plugged in and turned on for more than X days. The battery charging warning may inform the users how they can prevent future swelling, e.g., unplugging the laptop charger when the charge level of the battery is greater than 94%.

In some examples, triggering the battery charging warning may additionally trigger a change in charging behavior of the computing device. For example, triggering the battery charging warning locally or receiving the battery charging warning from a remote component or system may cause the firmware of the computing device to alter the current charging routine or mode, for example by causing the computing device to draw power from the battery until the charge level falls below 80%.

Figure 4:
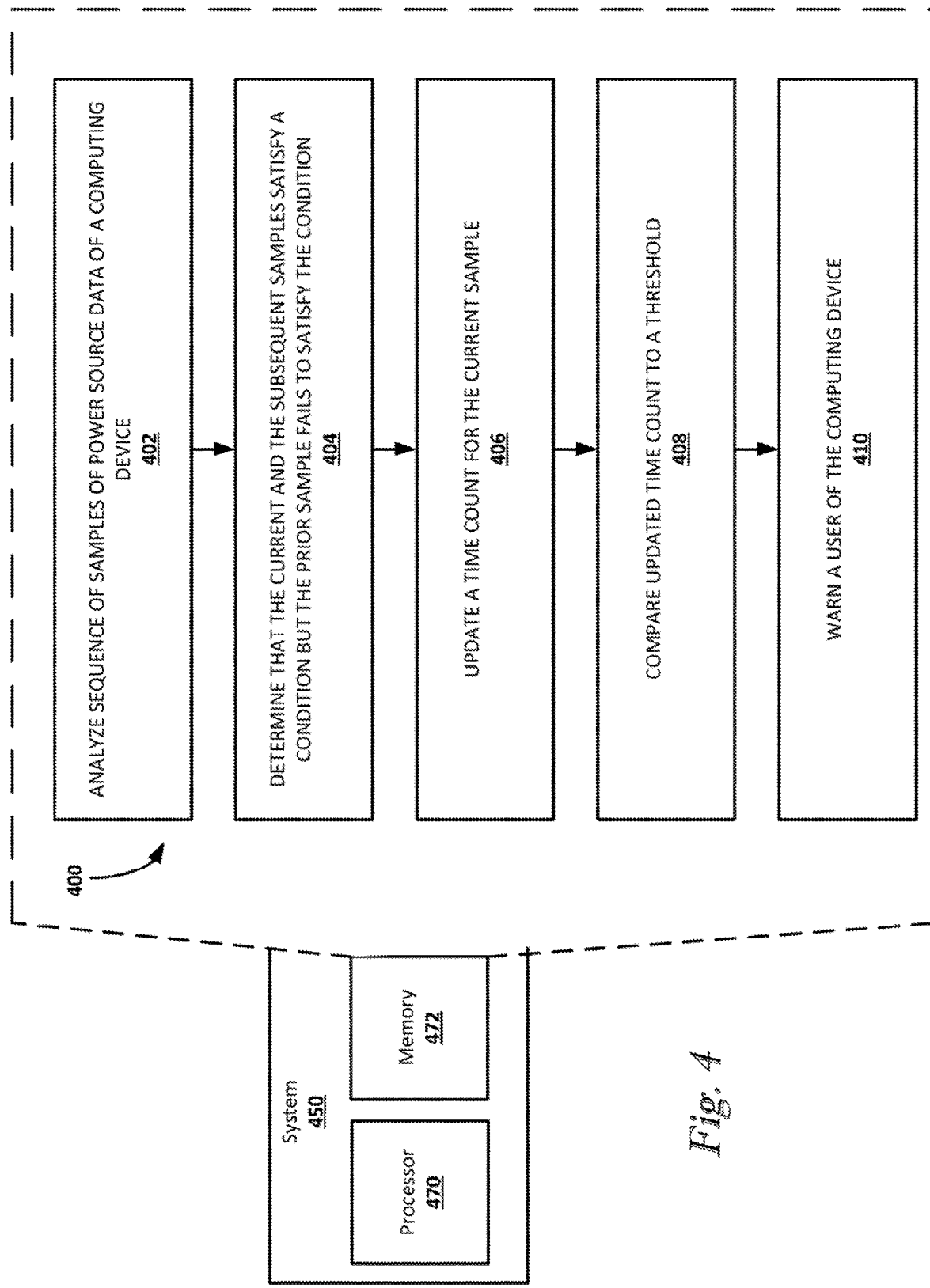
FIG. 4 illustrates an example system performing an example process, in accordance with an example of the present disclosure.

FIG. 4 depicts an example battery swelling monitoring system 450 performing an example process 400, in accordance with an example of the present disclosure. The system 450 of FIG. 4 includes a processor 470 and memory 472 storing instructions that, when executed, perform the process 400. Process 400 may be performed by a battery swelling monitoring system, such as the battery swelling monitoring system described above with respect to FIG. 1, 2, or 3, including a server and various user devices as described herein.

Process 400 begins with analyzing a sequence of samples of power source data for a computing device at block 402. The power source data of FIG. 4 can include the battery charging data of FIG. 1, 2, or 3. The power source data of FIG. 4 may include additional data associated with power sources of the computing device, such as parameters for electrical current draw, power or charging modes, power or charging processes, and power or charging states. Each sample may further indicate a timestamp or time period associated with the power source data of the sample. The sequence of samples analyzed at block 402 includes at least a prior sample, a current sample, and a subsequent sample.

Based on analyzing these sequential samples, the battery swelling monitoring system may determine, at block 404, that the current sample and the subsequent sample each satisfy a condition, but the prior sample fails to satisfy the condition. This condition may include that values of the battery charging data of the sample conform to certain proscribed values or value ranges associated with overcharging and/or overheating during overcharging of the battery. For example, the condition may include satisfying the two criteria of block 104 in FIG. 1 or the three criteria of block 204 in FIG. 2. In other examples, the condition may merely be conformance to a range of charge levels of the battery, e.g., at least 80% or over 94%. In some examples, the condition may include being the second, third, fourth, etc. sample in a row to satisfy the criteria of FIG. 1 or 2, or being associated with a minimum time period length or a maximum sampling period.

Subsequent to determining that the current and subsequent samples satisfy the condition but the prior sample does not, process 400 updates a time count for the current sample at block 406. The time count may be updated based on a time period indicated by the current sample, based on a length of time between the current sample timestamp and the subsequent sample timestamp, or based on a timestamp of the current sample and a maximum sampling period, as described herein. When the condition includes being the second, third, fourth, etc. sample in a row to satisfy the condition, the time count may further be updated based on time periods or time stamps indicated by the first, second, third, etc. most previous samples in the sequence. In some examples, the amount of time used to update the time count may be based on timestamps or time periods indicated by the samples and further based on adjustments made to this value based on the extent or length of the overcharging and/or overheating conditions. For example, the third hour of a battery having a charge level above 94% and having a temperature above 40 degrees Celsius may count as "more time" than the first or second hour that such conditions persist.

In some examples, more than one time count may be used to track more than one set of battery swelling indications. In some examples, multiple time counts may be updated at block 406. Each time count may be associated with its own conditions at block 404, that is the conditions met at block 404 may dictate which time count is updated, or each may be associated with the same condition at block 306. In some examples, each time count may be associated with the same condition at block 406, but may have additional criteria for how and when time should be added.

For example, one time count may track a continuous amount of time that a battery is overcharging, another may track an amount of time the battery is continuously overcharging within or above a certain range of battery temperatures, and another may track intermittent amounts of time spent overcharging while overheating over the battery's lifetime. In this example, the condition at block 406 may include a sample having power source data within certain values or ranges of values that indicate both overcharging and overheating, and at least one of the time counts will be updated based on whether the sample or additional samples of the sequence indicate continuous or intermittent appearance of these conditions. As another example, a value of the power source data may indicate "0" if no overheating while overcharging occurred during the time period corresponding to the sample, "1" if overheating while overcharging occurred during the entire time period corresponding to the sample, and a value between "0" and "1" if overheating while overcharging occurred during only part of the time period corresponding to the sample. In this example, any sample with a value above "0" may be used to update a time count, but a first time count may only be updated based on time periods with "1" values and another time period may be updated based on all time periods with a value above "0" or based only on time periods with values between "0" and "1".

In some examples, one time count may be used to update another time count or to determine an amount of time to use to update another time count. For example, one time count may track continuous overheating while overcharging, and another may track intermittent overheating while overcharging. In such an example, the value of the first time count may be used to update the value of the second time count when a new sample indicated that the overheating while overcharging conditions have ended, before the first time count is reset. As another example, one time count may track short-term battery charging behavior and it may be used to updated another time count tracking long-term battery charging behavior or tracking patterns of battery charging behavior.

Once the time count is updated at block 406, process 400 moves to block 408 to compare the updated time count to a corresponding threshold. As described above with respect to FIGS. 1, 2, and 3, the thresholds may be set for each time count based on the type of warning to be given, the type of behavior to be warned about, or empirical knowledge and/or known conditions of the battery, the computing device, and behavior of users or organizations associated with the batteries or computing devices or similar batteries or computing devices.

At block 410, based on the updated time count satisfying the threshold at block 408, the user of the computing device is provided with a warning, as described herein with respect to FIGS. 1, 2, and 3. In some examples, a time count may be associated with multiple thresholds acting as triggers for multiple different types of warnings. For example, a time count may be compared to a lower threshold to warn the user to unplug their device and with a higher threshold to warn the user to replace their battery.

Figure 5:
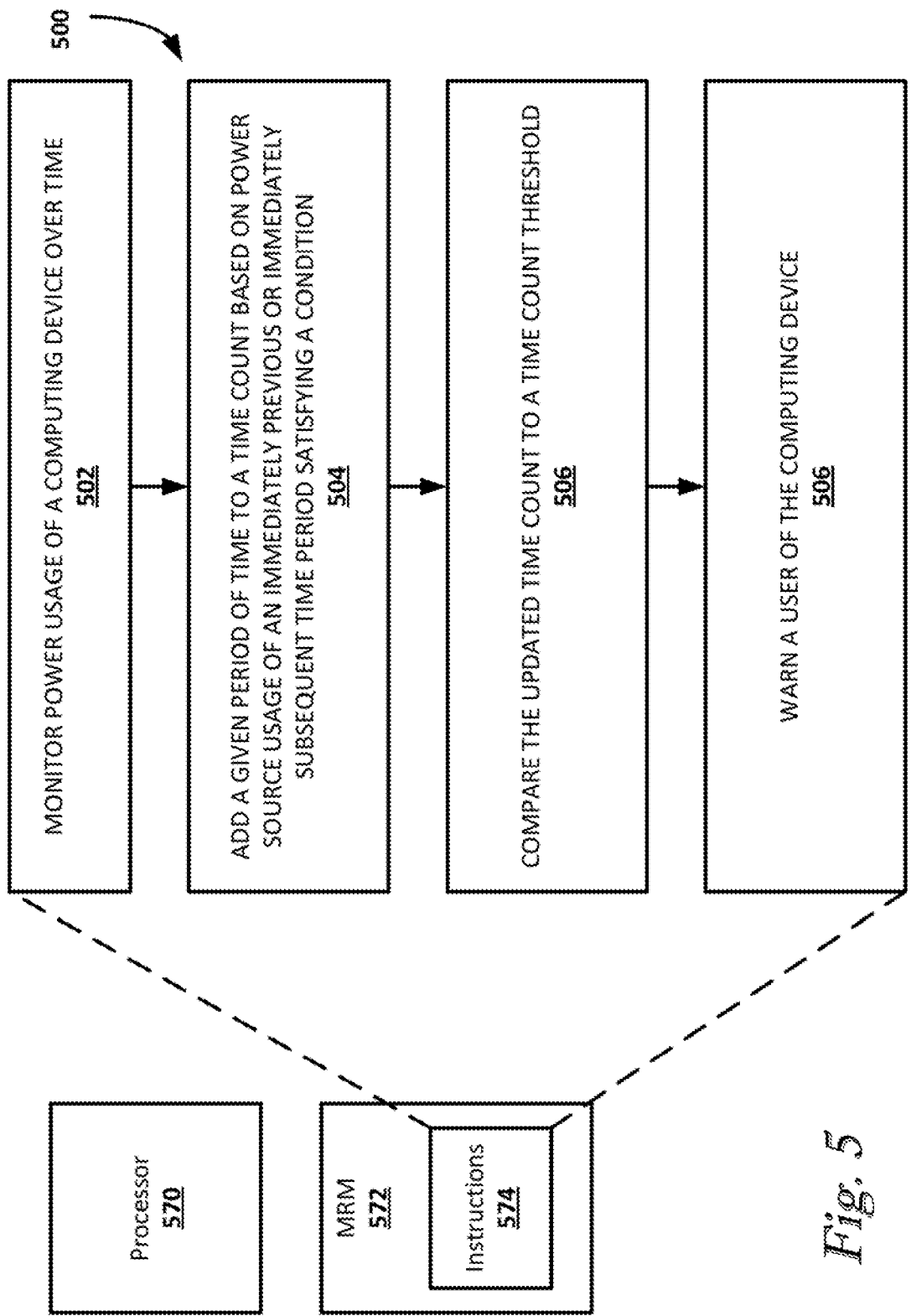
FIG. 5 schematically depicts an example machine readable medium with a processor, in accordance with an example of the present disclosure.

FIG. 5 schematically depicts an example non-transitory machine readable medium 572 with a processor 570, in accordance with an example of the present disclosure. The machine-readable medium 572 may include instructions 574 which, when executed by the processor 570, cause the processor to perform battery swelling monitoring process 500.

Battery swelling monitoring process 500 begins at 502 with monitoring the power source usage of a computing device, including battery usage and usage of another power source, over time. Monitored conditions of the power source usage may include tracked data and conditions described above with respect to FIGS. 1, 2, 3, and 4. For example, block 502 may include monitoring charge levels of the battery, temperatures of the computing device or the battery, which power source is being used at any given time by the computing device, when the battery is being charged by another power source, when the computing device transitions between "off" and "on" power states, and when the computing device transitions between "sleep" and "awake" power states.

In some examples, monitoring the power source usage over time may include identifying battery or computing device parameters and/or user behavior driving power source usage. In some examples, block 502 may include determining discrete or overlapping time periods in which certain power source usage patterns occurred. These time periods may be determined based on the power source usage data and empirical knowledge and/or known conditions about the computing device, the battery, and similar computing devices and batteries, including battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization associated with similar batteries or computing devices. For example, the battery swelling monitoring process 500 may have difficulty monitoring the power source usage of the computing device while the computing device is turned off. However, based on charge levels and battery temperatures indicated in time periods immediately previous or immediately subsequent to the time period in which the computing device was turned off, and based on historical data of the computing device that indicates battery discharge rates and battery warm up or cool down rates during charging, the battery swelling monitoring process 500 may be able to determine that power source usage conditions occurring while the computing device was turned off are likely to contribute to swelling of the battery.

At block 504, battery swelling monitoring process 500 adds a given time period to a time count based on the power source usage indicated by an immediately previous or immediately subsequent time period satisfying a condition. The time count may track the power source usage conditions that are likely to contribute to battery swelling. For example, the time count may track time periods of user charging behavior that is likely to lead to battery swelling. As another example, the time count may track time periods of battery conditions that are likely to lead to battery swelling. As yet another example, the time count may track time periods of battery conditions that indicate that the battery is likely already swollen.

The condition of block 504 may include the two criteria of block 104 in FIG. 1 or the three criteria of block 204 in FIG. 2. In other examples, the condition may merely be conformance to a range of charge levels of the battery, e.g., at least 80% or over 94%, and/or conformance to a range of battery temperatures, e.g., at least 35 degrees Celsius or over 40 degrees Celsius. In some examples, the condition may include a certain time period length. In some examples, the condition may further include that a minimum amount of time has passed, or a maximum amount of time has not passed, since a power state transition occurred for the computing device. For example, time periods in which the computing device has been turned on/off or put into sleep/wake mode repeatedly, or which correspond to short periods of time between the computing device being turned on/off or put into sleep/wake mode, may exhibit sufficiently different power source usage situations that they will not be used to add subsequent or previous time periods to the time count. In some examples, the condition may call for a certain degree of similarity of power source usage between the immediately previous time period and the immediately subsequent time period, or between the immediately previous or the immediately subsequent time periods and the given time period, to add the given time period to the time count. In some examples, the condition may include the immediately previous or immediately subsequent time period be the second, third, fourth, etc. time period in a row to meet certain power source usage criteria, or that one or both conform to a certain historical pattern of power source usage. In some examples, the given time period itself need not satisfy the condition to be added to the time count, so long as the immediately previous and/or immediately subsequent time period satisfies the condition, which may be include different criteria for the immediately previous time period than the immediately subsequent time period.

Subsequent to adding the given time period to the time count at block 504, battery swelling monitoring process 500 moves to block 506 where the updated time count is compared to a time count threshold. The time count threshold, as well as the condition of block 504, may be selected based on a determined amount of time that certain power source usage conditions that are likely to contribute to battery swelling. This amount of time and these certain power source usage conditions may be determined based on empirical knowledge and/or known conditions about the computing device, the battery, and similar computing devices and batteries, including battery thickness, battery cell supplier or manufacturer, manufacture or distribution conditions, particular battery charging routines or processes known to be used, particular battery charging modes known to be used, battery age, battery cycle count, computing device designs, other components present in a computing device, historical data about battery temperature during charging, and historical battery usage by members of an organization associated with similar batteries or computing devices.

At block 506, battery swelling monitoring process 500 warns the user of the computing device based on results of the comparison of the updated time count to the time count threshold at block 504. The warning may be presented or delivered to the user as described herein with respect to FIGS. 1, 2, 3, and 4.

It shall be recognized, in light of the description provided, that the elements and procedures described above may be implemented in a computer environment using hardware, computer-readable instructions, firmware, and/or combinations of these. Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What is claimed is:

1. A method, comprising:
    periodically sampling battery charging data associated with a battery of a computing device, wherein each sample of the battery charging data includes indications of a temperature, a charge level, and whether a power source is recharging the battery;
    determining that a first sample of the sampled battery charging data satisfies a condition;
    determining that a second sample of the sampled battery charging data that precedes the first sample also satisfies the condition;
    based on determining that the first and second samples satisfy the condition, adding a selected amount of time to a time count, wherein the selected amount of time is selected based on the temperature associated with the first or second sample in the sampled battery charging data;
    comparing the updated time count to a threshold that is selected based on a criterion; and
    triggering a warning based on the comparing.

2. The method of claim 1, wherein the criterion includes empirical knowledge about a manufacturer or supplier of the battery.

3. The method of claim 1, wherein the criterion includes empirical knowledge about a computing device in which the battery is installed.

4. The method of claim 1, wherein the criterion includes empirical knowledge about how an organization that operates the computing device utilizes batteries associated with other similar computing devices.

5. The method of claim 1, wherein the condition includes a temperature threshold and a charge level threshold.

6. The method of claim 1, further comprising:
    subsequent to adding the amount of time to the time count:
    lowering the time count based on determining that a third sample of the sampled battery charging data that follows the first sample fails to satisfy the condition.

7. A system comprising a processor and memory storing instructions that, in response to execution of the instructions by the processor, cause the processor to:
    analyze a sequence of samples of power source data associated with a computing device including at least a prior sample, a current sample, and a subsequent sample, each sample indicating of a temperature, a battery charge level, and a power source of the computing device;
    determine that the current sample and the subsequent sample satisfy a condition but the prior sample fails to satisfy the condition;
    based on the determining, updating a time count for the current sample;
    compare the updated time count to a threshold; and
    warn a user of the computing device based on the comparing.

8. The system of claim 7, wherein updating the time count comprises adding an amount of time to the time count, and wherein the amount of time to add to the time count is determined based on the prior sample being associated with a change in the power source.

9. The system of claim 7, wherein the power source data further indicates power state transitions of the computing device including sleep and wake state transitions and updating the time count comprises adding an amount of time to the time count, and wherein the amount of time to add to the time count is determined based on the prior sample being associated with a power state transition.

10. The system of claim 7, wherein updating the time count comprises determining an amount of time to add to a first time count or a second time count based on the temperatures associated with the current sample and the subsequent sample, and wherein the first time count and the second time count are each compared to different thresholds when they are updated.

11. The system of claim 10, wherein the first time count or the second time count is selected for updating based on the temperatures associated with the prior sample and the current sample.

12. The system of claim 7, wherein the condition includes a temperature threshold and a charge level threshold.

13. A non-transitory computer-readable medium comprising instructions that, in response to execution of the instructions by a processor, cause the processor to:
- monitor usage of a computing device, including a battery and another power source, over time;
- add a given time period, of the monitored time, to a time count based on the power source usage of an immediately previous or an immediately subsequent time period satisfying a condition; and
- subsequent to the given time period being added to the time count:
  - compare the updated time count to a time count threshold, and
  - warn a user of the computing device based on the comparing.

14. The non-transitory computer-readable medium of claim 13, wherein data describing the monitored power source usage for each monitored time period indicates a temperature of the battery, a charge level of the battery, whether the battery is being charged by the other power source, and whether the computing device transitions between a sleep power state and an awake power state.

15. The non-transitory computer-readable medium of claim 14, wherein the condition is based on the data describing the monitored power source usage during the immediately previous or the immediately subsequent time period meeting a set of criteria, and wherein the condition further includes a length of time corresponding to the immediately previous or the immediately subsequent time period.

* * * * *